United States Patent
Pedrone et al.

(10) Patent No.: US 10,796,029 B2
(45) Date of Patent: Oct. 6, 2020

(54) SOFTWARE CONTROLLED PORT LOCKING MECHANISMS

(71) Applicant: International Business Machines Corporation, Armonk, NY (US)

(72) Inventors: Miles C. Pedrone, Poughkeepsie, NY (US); Andrew C. M. Hicks, Wappingers Falls, NY (US); Michael P. Lyons, Poughkeepsie, NY (US); Yunli Tang, Wappingers Falls, NY (US); Tynan J. Garrett, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 15/828,249

(22) Filed: Nov. 30, 2017

(65) Prior Publication Data
US 2019/0163936 A1 May 30, 2019

(51) Int. Cl.
*G06F 21/85* (2013.01)
*G06F 13/42* (2006.01)

(52) U.S. Cl.
CPC .......... *G06F 21/85* (2013.01); *G06F 13/4282* (2013.01); *G06F 2213/0026* (2013.01)

(58) Field of Classification Search
CPC .......... G06F 21/31; G06F 21/44; G06F 21/70; G06F 21/78; G06F 21/82; G06F 21/85–86; G06F 21/88
See application file for complete search history.

(56) References Cited

U.S. PATENT DOCUMENTS

| 6,145,085 | A  | * | 11/2000 | Tran ........................ G06F 21/31 726/5 |
| 6,745,330 | B1 |   | 6/2004  | Maillot |
| 9,460,319 | B1 | * | 10/2016 | Munns .................... G06F 21/86 |
| 2004/0268074 | A1 | * | 12/2004 | Yagi ........................ G06F 21/78 711/164 |
| 2005/0066069 | A1 |   | 3/2005  | Kaji |

(Continued)

FOREIGN PATENT DOCUMENTS

| WO | 9605552 A1 | 2/1996 |
| WO | 03034365 A1 | 4/2003 |
| WO | 2014171917 A9 | 10/2014 |

OTHER PUBLICATIONS

"RJ Lockdown CAT5 & 6 Patch Cord Lock", Rjlockdown, LLC., Friday, Aug. 25, 2017 9:57, 3 Pages, <http://www.rjlockdown.com/patchcordpage.html>.

(Continued)

*Primary Examiner* — Minh Dinh
(74) *Attorney, Agent, or Firm* — David B. Woycechowsky

(57) ABSTRACT

An operating system for a computer device that includes code in the form of a hook that controls lock in and lock out of a removable data communication connection object (for example, a cable terminating in a connector, a card) with respect to a data communication port by means of an electromechanical lock. Software requiring system administrator authentication to lock a removable data communication connection object out of a data communication port. Software requiring system administrator authentication to lock a removable data communication connection object into a data communication port.

8 Claims, 7 Drawing Sheets

(56) References Cited

U.S. PATENT DOCUMENTS

| | | | |
|---|---|---|---|
| 2006/0221990 A1 | 10/2006 | Muller | |
| 2010/0045232 A1 | 2/2010 | Chen | |
| 2013/0346660 A1 | 12/2013 | Kwidzinski | |
| 2014/0223587 A1* | 8/2014 | Chen | G06F 21/88 726/35 |
| 2015/0020189 A1* | 1/2015 | Soffer | G06F 21/85 726/16 |
| 2015/0341177 A1 | 11/2015 | Ylimartimo et al. | |

OTHER PUBLICATIONS

Anandhi et al., "Prevention of DDOS Attacks on Distributed Cloud Servers by Port Lock Mechanism", vol. 11, No. 5, Mar. 2016, ISSN 1819-6608, ARPN Journal of Engineering and Applied Sciences, ©2006-2016 Asian Research Publishing Network (ARPN). All rights reserved, 7 pages.

* cited by examiner

```
ENTER SYSTEM ADMINISTRATOR P/W: PASSWORD
WOULD YOU LIKE TO UNLOCK THE PORT: Y
ENTER SYSTEM ADMINISTRATOR P/W: PASSWORM
TRY AGAIN: PASSWORD
WOULD YOU LIKE TO UNLOCK THE PORT: Y
ENTER SYSTEM ADMINISTRATOR P/W: PASSWORD
WOULD YOU LIKE TO UNLOCK THE PORT:
```

SOFTWARE CONTROLLED PORT LOCKING MECHANISMS

BACKGROUND

The present invention relates generally to the field of data communication connection ports built into computer devices (for example, laptop computers, desktop computers, external hard drives, printers, smartphones, etc.).

"Data communication connection ports" are ports that: (i) are connectable to data communication cables; and (ii) communicate a non-negligible amount of data. For example, a computers power cable port, connectable to a power cable, is not herein considered as a data communication connection report. On the other hand, some USB (universal serial bus) ports do communicate both power and a substantial amount of data in normal operations, and would, therefore, be properly considered as a "data communication connection port."

Some known types of data communication connection ports are as follows: (i) Ethernet; (ii) Transceiver; (iii) Small Form-factor Pluggable (SFP); (iv) Enhanced Small Form-factor Pluggable (SFP+); (v) Quad Small Form-factor Pluggable (QSFP); (vi) 10 Gigabit Small Form-factor Pluggable (XFP); (vii) CFP (C Form-factor Pluggable); (viii) Gigabit Interface Converter (GBIC); (ix) Direct Attach Cable (DAC); (x) Active Optical Cable (AOC); (xi) Universal Serial Bus Type-A (USB-A); (xii) Universal Serial Bus Type-C (USB-C); (xiii) DisplayPort; (xiv) Serial Advanced Technology Attachment (SATA); (xv) External Serial Advanced Technology Attachment (eSATA); (xvi) High-Definition Multimedia Interface (HDMI); (xvii) Integrated Drive Electronics (IDE); (xviii) Video Graphics Array (VGA); and (xiv) FICON (fiber connection) channel.

"Data communication port" is further hereby defined to include hardware for accommodating and communicating with a card, such as a full PCIE (Peripheral Component Interconnect Express) card. "Cable style data communication port" is hereby defined to be limited to data communication ports that are designed to accept cable ends. "Card style data communication ports" is herein defined to be limited to data communication ports designed to accept cards. As with cable style data communication ports, card style data communication ports may communicate power along with data communication functionality.

US patent application 2016/0294118 ("Ahn") discloses the following: "USB PORT LOCKING DEVICE . . . Provided is a USB port locking device including: a blocking member having a blocking coupling part to block access of an external device; an external USB port part connected to the blocking member and to which an external USB connection port is insertively coupled; a signal connection part enabling signal transmission between a terminal inside the USB port of the electronic device and the external USB connecting port; a locking member selectively locked to the electronic device so that the blocking member is not forcedly removed; a stopping member selectively blocking an unauthorized external USB connecting port from being inserted into the external USB port part; and a lock member controlling a locking operation of the locking member and a blocking operation of the stopping member by interfering with the locking member and the stopping member when they are inserted into the blocking member."

SUMMARY

According to an aspect of the present invention, there is a method, computer program product and/or system that performs the following operation: providing a computer device with a data communication port that includes an electromechanical lock that is movable between at least two positions as follows: (a) a locked position where any mechanically engaged removable data communication object is locked from being removed from mechanical engagement with the data communication port and any uninserted data communication object is locked out from mechanically engaging the data communication port; and (b) an unlocked position where removable data communication objects are free to be mechanically engaged and disengaged with the data communication port According to an aspect of the present invention, there is a method that performs the following operation: moving, under control of an unlock hook in the operating system of the computer device, the electromechanical lock from the locked position to the unlocked position.

According to an aspect of the present invention, there is a method, computer program product and/or system that performs the following operation: after a removable mechanical data communication object has been mechanically engaged with the data communication port, moving, under control of an unlock hook in the operating system of the computer device, the electromechanical lock from the unlocked position to the locked position.

DETAILED DESCRIPTION

Figure 1:
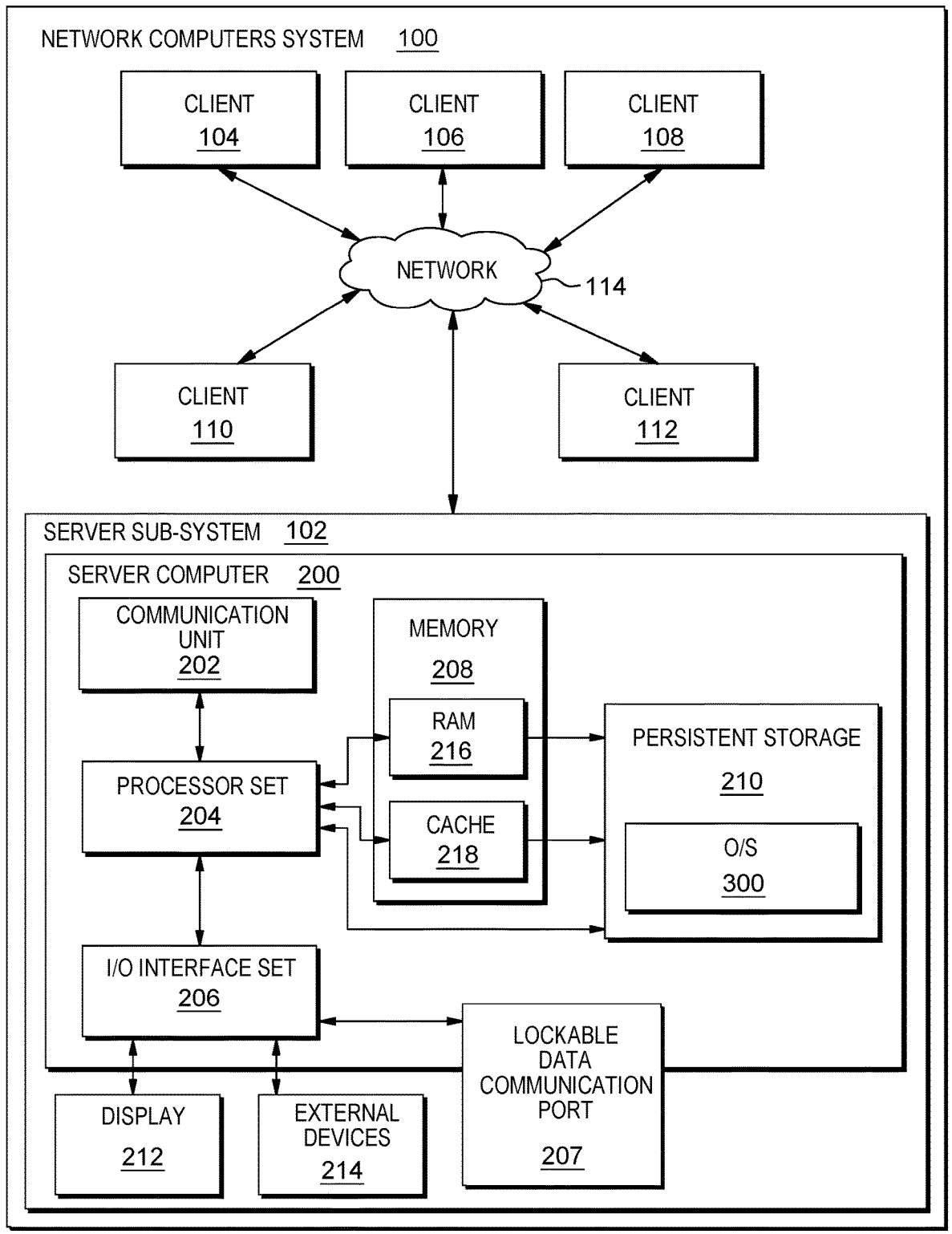
FIG. 1 is a block diagram view of a first embodiment of a system according to the present invention.

Some embodiments of the present invention are directed to an operating system for a computer device that includes code in the form of a hook that controls lock in and lock out of a removable data communication connection object (for example, a cable terminating in a connector, a card) with respect to a data communication port by means of an electromechanical lock. Some embodiments of the present invention include software (for example, firmware) requiring system administrator authentication to lock a removable data communication connection object out of a data communication port. Some embodiments of the present invention include software requiring system administrator authentication to lock a removable data communication connection object into a data communication port. This Detailed Description section is divided into the following sub-sections: (i) The Hardware and Software Environment; (ii)

Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and operating system (also sometimes herein referred to as "program") 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
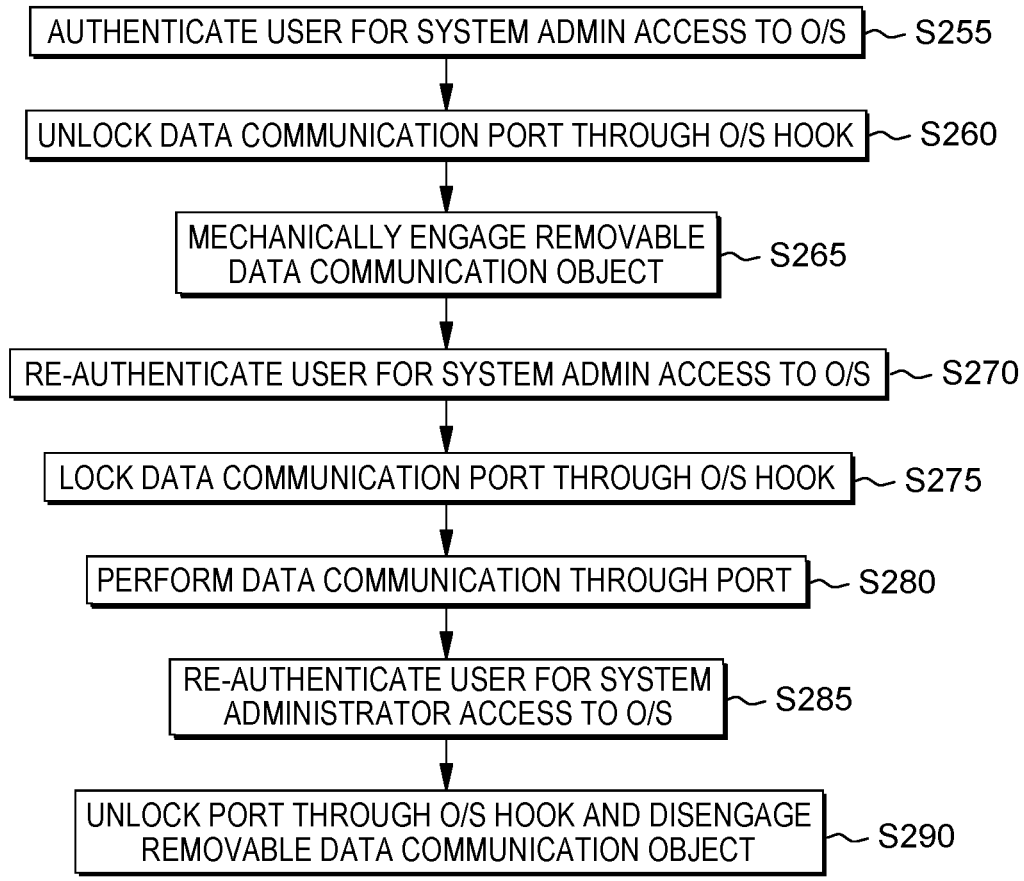
FIG. 2 is a flowchart showing a first embodiment method performed, at least in part, by the first embodiment system.
Figure 3:
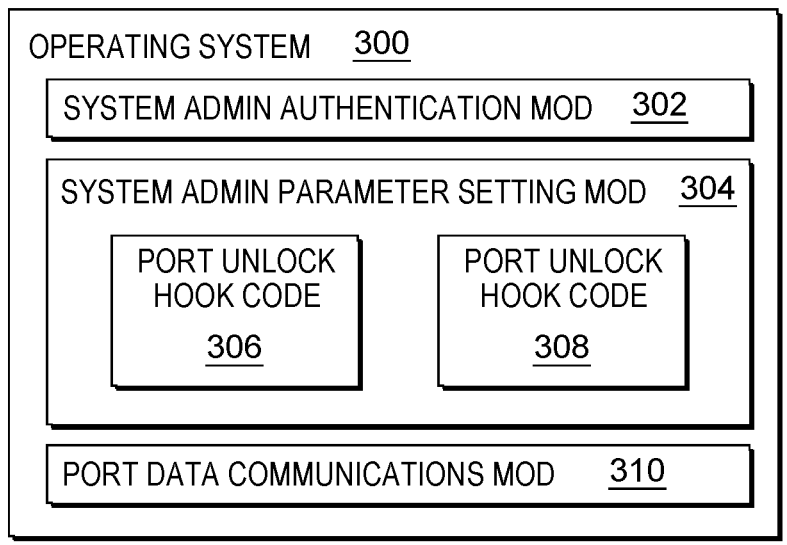
FIG. 3 is a block diagram showing a machine logic (for example, software) portion of the first embodiment system.

FIG. 2 shows flowchart depicting a method according to the present invention. FIG. 3 shows program 300 for performing at least some of the method operations of the flowchart of FIG. 2. This method and associated software will now be discussed, over the course of the following paragraphs, with extensive reference to FIG. 2 (for the method operation blocks) and FIG. 3 (for the software blocks).

Processing begins at operation S255, where system authentication module ("mod") 302 authenticates a user of client sub-system 104 (see FIG. 1) for system administrator type client access to operating system (O/S) 300, specifically system administrator parameter setting mod 304 of O/S 300. In this example, the system administrator is remote from server computer 200 and communicates with it through communication network 114. This authentication is shown at the first line of screenshot 400 of FIG. 4.

Figure 8:
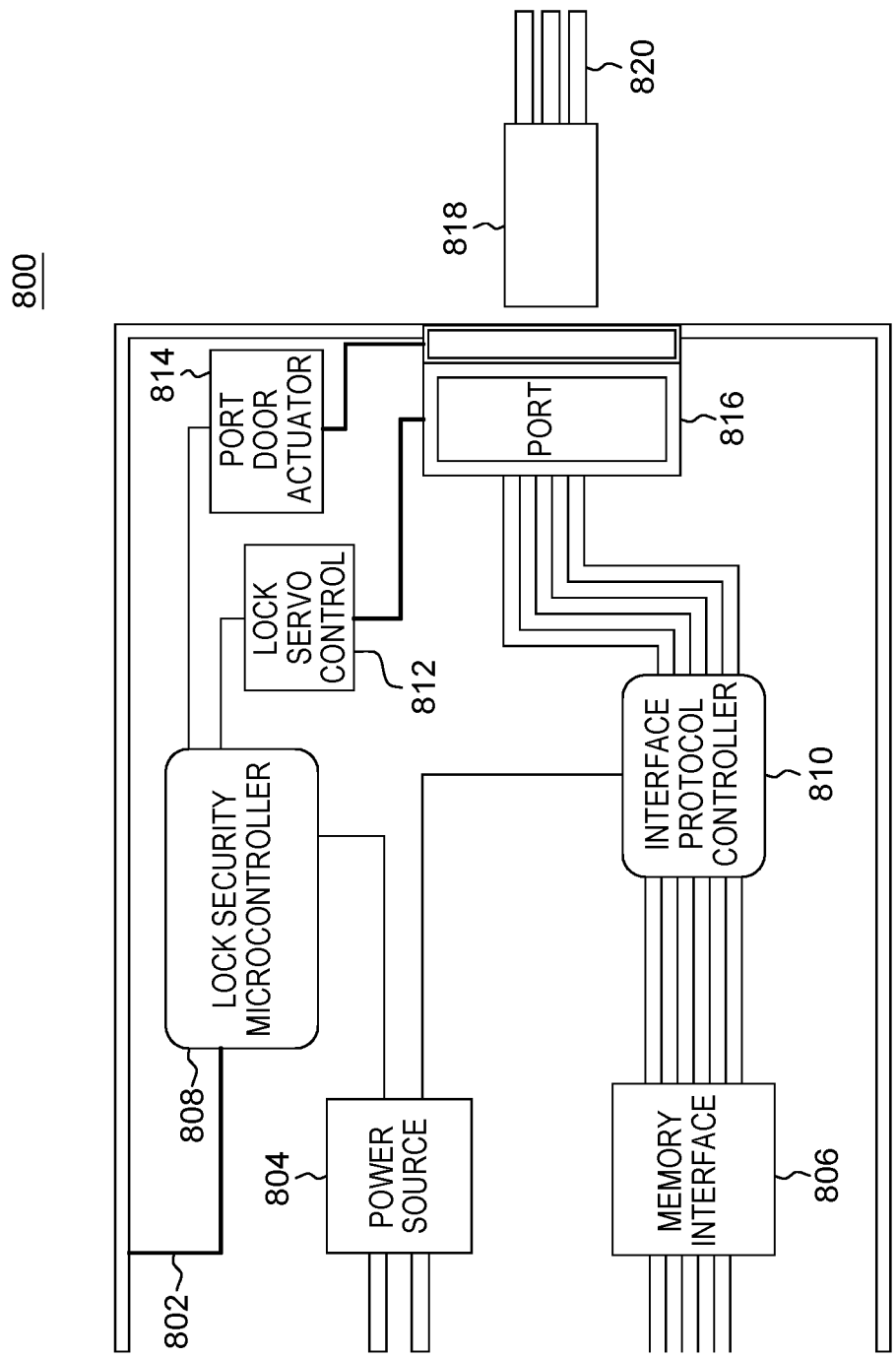
FIG. 8 is a block diagram of a second embodiment of a system according to the present invention.

Processing proceeds to operation S260, where the system administrator uses port unlock hook code 306 of mod 304 of O/S 300 to unlock an electromechanical lock that was physically blocking removable data communication objects from being inserted into lockable data communication port 207 of server computer 200 (see FIG. 1). "Removable data communication object" is hereby defined as any object that can be removably mechanically engaged with a data communication port so that data communication with the computer device hosting the data communication port can take place through the data communication port and the removable data communication object. Types of data communications objects include: card type and cable end type. For example, a universal serial bus (USB) flash drive is a cable type of removable data communication object because, while it does not typically include a cable, it does have a USB connector of the type which is typically located at the end of a data communication cable. A more detailed example of the components that could be used for mod 207 is shown in FIG. 8, and discussed below in connection with FIG. 8.

Processing proceeds to operation S265, where a local user (not the remote system administrator) mechanically engages a data communication object with data communication port 207. The local user is only able to do this because the electromechanical lock on port 207 was unlocked by the system administrator at operation S260.

Processing proceeds to operation S270, where the system administrator re-authenticates, as shown in screenshot 400, because she has been informed (in this example, by a telephone call) that the local user has mechanically engaged the removable data communication object into lockable data communication port 207, so the port is ready for re-locking.

Processing proceeds to operation S275, where the system administrator uses port lock hook code 308 to re-lock the port and thereby lock the removable data communication object into the port by its electromechanical lock. The system administrator's user interface for doing this is shown in screenshot 400.

Processing proceeds to operation S280 where data communication with server computer 200 takes place through lockable data communication port 207 and the removable data communication object that is locked into it. This data communication is provided under control of port data communications mod 310.

Processing proceeds to operation S285, where the system administrator re-authenticates, as shown in screenshot 400, because she wants the local user to mechanically disengage the removable data communication object from lockable data communication port 207.

Figure 4:
FIG. 4 is a screenshot view generated by the first embodiment system.

Processing proceeds to operation S290, where the system administrator uses port unlock hook code 306 of mod 304 of O/S 300 to unlock the electromechanical lock of lockable data communication port 207 of server computer 200 (see FIG. 1) that is preventing the removable data communication object from being removed. The screenshot of FIG. 4 is shown at the point in time where the system administrator is about to give unlock hook 304 the instruction to unlock the port to permit removal of the removable data communication object. After this instruction is given and the electromechanical lock of the port is unlocked, the local user physically removes the removable data communication object from the port.

III. Further Comments and/or Embodiments

Some embodiments of the present invention recognize the following facts, potential problems and/or potential areas for improvement with respect to the current state of the art: (i) physical access vulnerabilities are a potential problem for all secure systems; (ii) while much attention is given to mitigating potential hacks and vulnerabilities on the software level, this only further emphasizes the importance of reducing physical access vulnerabilities as a single exploit could potentially circumvent existing software measures; (iii) current operating system technology does not have the capability to add granularity to existing security infrastructure with respect to software-level security mechanisms on the physical system; and/or (iv) current systems use a physical lock and key to protect access to the hardware inside which can be picked, broken, copied, etc. with enough time.

Some embodiments of the present invention may include one, or more, of the following features, characteristics and/or advantages: (i) new preventative measures through software-controlled "lock-out" of ports on a system ("lock-out" herein refers to physically locking out connectors from making a mechanical connection such that data communication can take place through the port and should not be confused with "port locking" that locks a data communication connector into a mechanical and data communicative connection with the data communication port); (ii) port locking for mitigation of physical vulnerabilities (as opposed to software level security vulnerabilities); (iii) a physical (that is, mechanical) port lock-out mechanism controlled in its lock out operation by software running on the computer device into which the port is built; and/or (iv) a physical (that is, mechanical) port lock-out mechanism controlled in its lock out operation by software running on a computer device that is remote from the computer device into which the port is built.

Some embodiments of the present invention may include one, or more, of the following features, characteristics and/or advantages: (i) software-level security mechanisms on the physical system; (ii) use of hooks coded into the operating system or firmware; (iii) adding additional control through the operating system where one can remotely control access to a given part of the machine through permissions granted by the security administrator; (iv) this provides the administrator with additional privileges as they can override the physical lock; (v) prevents access to a data communication port by malicious attackers who have a physical key, but not the software-level permissions; and/or (vi) uses a physical lock is an electronically actuated mechanical device governing access to individual FICON, ethernet, and other I/O such as full PCIE cards themselves. A "hook" is hereby defined as any piece of computer code that specifically accesses part(s) of the hardware of a computer system—the computer code of the "hook" will hook into a specific piece of hardware and can control it.

The details of the electro-mechanical devices used to achieve lock-out mechanisms are not set forth in detail herein because, as will be appreciated by those of skill in the art, existing electro-mechanical devices, similar in construction to those used to do conventional port locking (see Background section, above), can be used. However, despite this potential similarity between conventional port locking mechanisms, and lock-out mechanisms that may be used in some embodiments of the present invention, one should keep in mind the important difference that port locking mechanisms lock a connector or card into the data communication port, while the lock-out mechanisms of the present invention are controlled by software (for example, an operating system of a computer device into which the data communication port is built) to lock connectors and/or cards out of the data communication port.

Some embodiments of the present invention may include one, or more, of the following features, characteristics and/or advantages: (i) use case of locking mechanism to control access to FICON channels (this potentially solves a problem that occurs when a technician incorrectly removes a high-priority cable); (ii) a more operational advantage of software-level activation improves system operation integrity by customers on their own machines; (iii) consider the situation where a customer has one drawer that is performing extremely important work that absolutely cannot go down (for example, if the ports to this drawer are always locked from the OS, then there is no chance of a technician mistakenly changing a cable from this drawer rather than a lower-priority one); (iv) OS-level control also facilitates inherent coordination between a system administrator and any connection (for example, FICON) changes made on the machine; (v) removing a cable requires software-level activation from a power user, so the user must always be notified of any changes to existing hardware; (vi) over time, this will become routine and lower the risk of human error during hardware changes of the system; and/or (vii) alleviates the job responsibilities of the job administrator to delegate the work to others.

In a more detailed example, suppose a technician is only supposed to work on certain machines at certain times (their shift). In an embodiment of the present invention, their access is controlled to lock those technicians out of inserting cards and/or connectors into the drawers or machines that they are not supposed to work on. This prevents malicious or accidental changes to the system's connections. This could be expanded further through multi-tenancy access agreements (much like a filesystem).

In some embodiments, in situations where a trusted employee is required to service the machine, with certain protocols in place, the trusted employee could temporarily allow another on-premise employee to service the machine (for something like a rudimentary fix). This could dramatically reduce required labor and also decrease the amount of time required to apply a hot fix. Given that the trusted employee typically has more visibility into the system, it could give the trusted employee more information to help other employee(s) during a repair operation.

Some embodiments provide an extra safety mechanism during a critical situation, for example, a service outage, disaster recovery (DR), etc. In this situation, an experienced system administrator has been awake for long durations (24+ hrs) and removes cables from the active site rather than the DR site due to the stress and brevity of the requirements. Some embodiments additionally prevent unintended port removal as it would only allow physical changes (switching, adding, removing cables) to the DR site's effected hardware. These embodiments also physically lock (from the software-level controls by the lock-out functionality of the present invention) the cables from the active site. This is essentially a two-layer authentication protocol for any changes to the physical system.

Imprudent and/or unauthorized changes in data communication connections can be mitigated, or completely prevented, by a mechanical switch that locks a port, for example an ethernet cable, and is activated by the device firmware itself. This way, during operation, there is no way for the cable to be removed and targeted as a point of entry.

The lock-out functionality can be provided, in various embodiments of the present invention, by: (i) electronic pin; (ii) mechanical screw or sheathe mechanism; (iii) auto-destroy mechanism past a certain amount of force; and/or (iv) anti-shake detector.

Further with respect to item (i) in the list of the preceding paragraph, an electronic pin may take the form of a simple cylinder could extend behind the ethernet cables and prevent their plastic head/connector from being inserted. In some embodiment, the electromechanical part of the lock-out system could be perpendicular from the user, that is, it would move in and out of the page if the page is the backside of the server (same direction as the inserted cable).

Further with respect to item (ii) in the list of the paragraph two paragraphs previous, the mechanical screw or sheathe mechanism can be electrically activated to prevent the space/form factor from becoming really intrusive. Some embodiments may employ conventional physical keys in addition to the software based lock-out control. For example, in some embodiments, a custom-made tool that only certain techs or admins have could be required to fully remove the lock out of cards and/or connectors. That way a hacker would need this tool to gain access well.

Further with respect to item (iii) in the list of the paragraph three paragraphs previous, in some embodiments, an auto-destroy mechanism past a certain amount of force could be implemented by a kind of "fuse" mechanism on the machine's port itself. If it detects tampering, it can close off the port itself with actuated pins. After this occurs, the design of the mechanical housing can prevent moving the pins back until it's been removed from the drawer/chip/etc. This acts like a fuse because once it's blown you can't use it until you replace it. This could also be done non-destructively, meaning no need to replace parts, just that the parts need to be removed and unlocked in order to function again.

Further with respect to item (iv) in the list of the paragraph four paragraphs previous, in some embodiments, an anti-shake detector is employed in parallel with all of the other mechanisms, so it could be presented as a pervasive security mechanism that supports the rest of these preventative measures.

Some embodiments of the present invention may include one, or more, of the following features, characteristics and/or advantages: (i) software-level security mechanisms on the physical system; (ii) this can be achieved through hooks into the operating system or firmware; (iii) adding additional control through the operating system where one can remotely; (iv) control access to a given part of the machine through permissions granted by the security administrator (this provides the administrator with additional privileges as they can override the physical lock, preventing said malicious attackers who have the physical key, but not the software-level permissions); (v) a physical lock is an electronically actuated mechanical device governing access to individual FICON, power, ethernet, and other I/O such as full PCIE cards themselves; (vi) a software program that prevents hardware from being inserted into a computer or mainframe or other computing device; (vii) applies to the mechanics of the locks for specific port types (networking, fiber, Ethernet, etc.) that are the key for management by system administrators; (viii) the unlocking is done through a system administrative panel on the system that contains the lock; (ix) lock-out is managed via a panel the system administrator can use; and/or (x) use of security in the lock here which can prevent unwanted people from detaching the device.

Some embodiments of the present invention may include one, or more, of the following features, characteristics and/or advantages: (i) uses an application to control port locking but the port to be locked is not at the application layer but at the hardware layer to physical external mediums; (ii) a physical lock as well as a software enable to the lock that allows for access management as well as prevents user from removing cables; (iii) a software program that prevents hardware from being removed from a computer or mainframe or other computing device; (iv) locking of the port by which the two devices in this invention would be connected by and the connection could only be manipulated by trusted users/system administrators; and/or (v) addresses the management of the connections such that incorrect connections are not removed from the system and are removed by the right people.

Figure 5A:
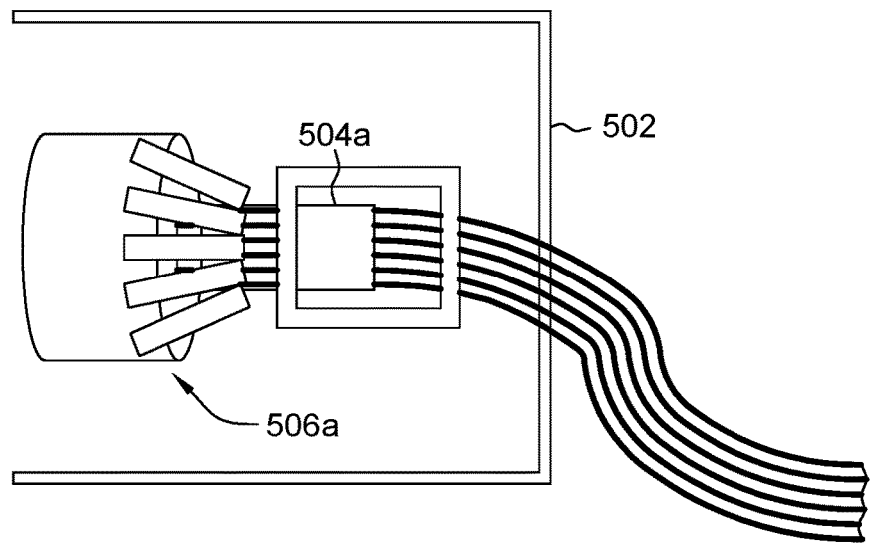
FIGS. 5A and 5B show an embodiment of a drill type data communication port according to an embodiment of the present invention.
Figure 5B:
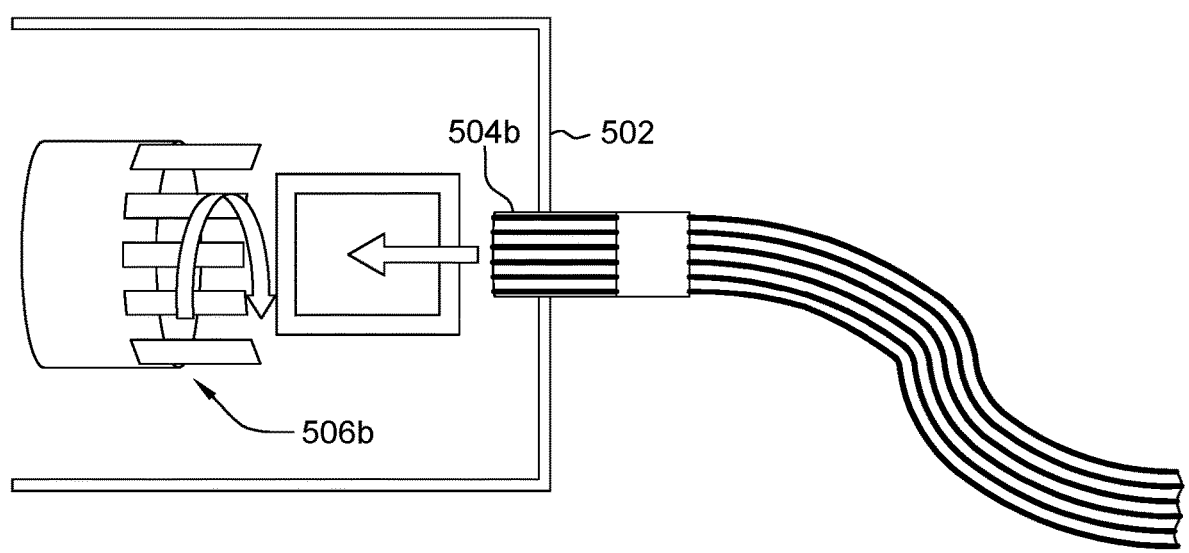

As shown in FIGS. 5A (locked in position) and 5B (unlocked position), drill type lock in/out port assembly 500a, 500b includes: adapter 502 (that contains port and locking mechanism); data communication cable end 504a (locked into port position); data communication cable end 504b (unlocked and removed from port position); drill type locking mechanism 506a (engages when port is plugged, in twisted and locked position); and drill type locking mechanism 506b (ready to be twisted and closed position). The drill type lock clamp down on the cable once it is plugged into the port similar to how a drill secures a drill bit into a location. In the case of a drill lock, the circumferentially arranged pieces or teeth (no separate reference numeral) are the moving pieces. Similar to the way a drill bit is locked into place in a drill. The teeth are together in the locked state preventing a cable from being plugged. When a system administrator would like to plug in a cable into the adapter he must go to the OS interface and authenticate and then open the port. When the port is opened the teeth open allowing a cable to be inserted. Once the cable is snuggly in the slot the teeth come down on the cable preventing it from being removed.

Figure 6A:
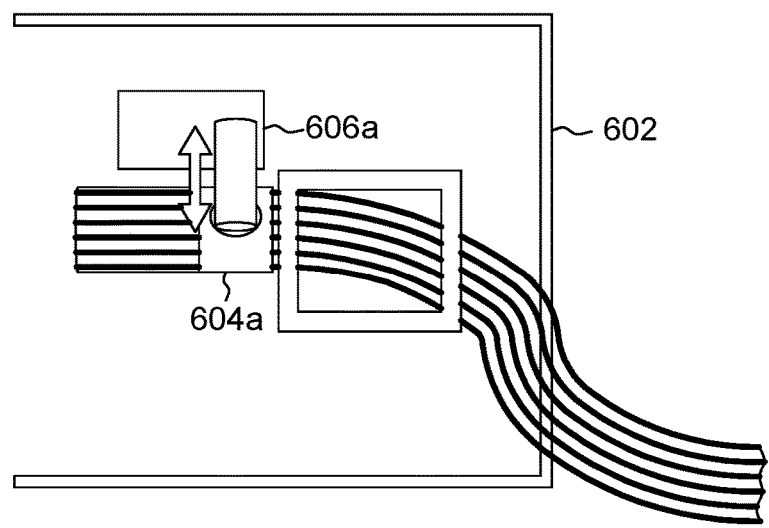
FIGS. 6A and 6B show an embodiment of a solenoid type data communication port according to an embodiment of the present invention.
Figure 6B:
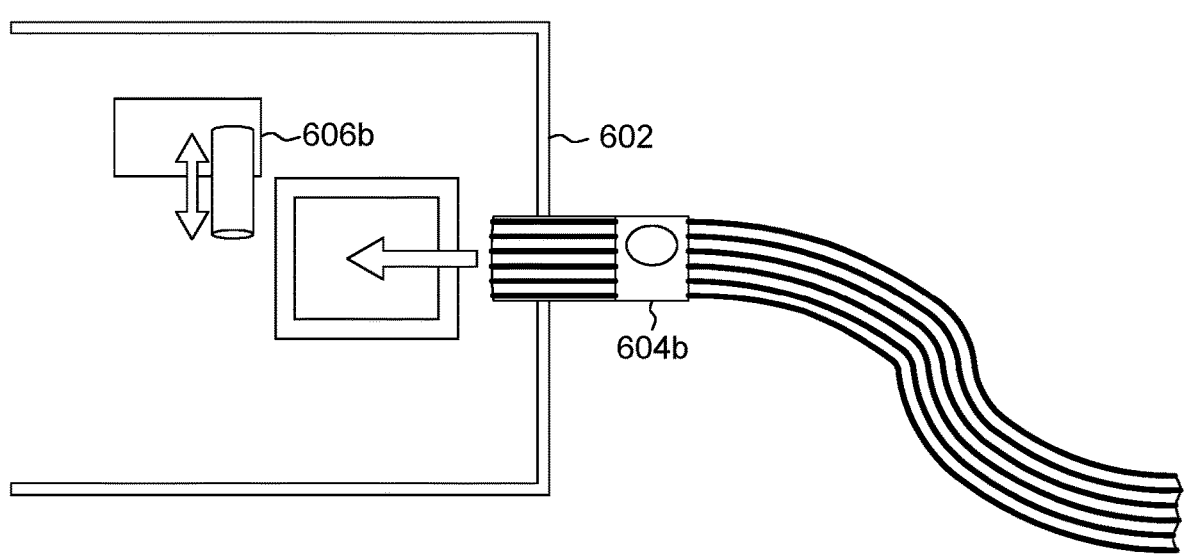

As shown in FIGS. 6A (locked in state) and 6B (locked out state), solenoid type lock in/lock out port assembly 600a, 600b includes: adapter 602 (that contains port and locking mechanism); special cable end 604a (with recess locked in by extended solenoid member); special cable end 604b (with solenoid member disengaged from its recess to unlock and allow disconnection of cable end); solenoid type locking mechanism 606a (in position with rod extended to mechanically lock cable end into data communication connection); and solenoid type locking mechanism 606b (with cable end disengaged and rod extended to lock special cable end out of data communication connection). This magnetic type lock uses a magnetic actuator to extend and retract a pin that goes into the cable as it goes into the port. In the case of a solenoid lock, the moving piece is a cylinder that extend into the port plugging area. In the normal state, the cylinder is down preventing anything from being plugged into the port. When a system administrator would like to plug in a cable into the adapter he will go to the OS interface and authenticate and open the port through the software interface. When the port is opened the cylinder is retracted into the solenoid housing allowing the cable to fit into the port. Once the cable is in the port the cylinder is then extended into the cable preventing it from being moved.

Figure 7A:
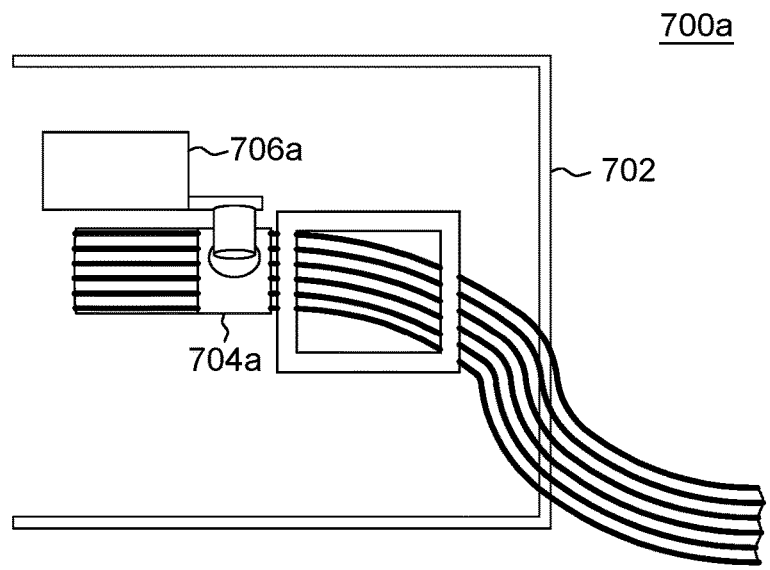
FIGS. 7A and 7B show an embodiment of a pin type data communication port according to an embodiment of the present invention.
Figure 7B:
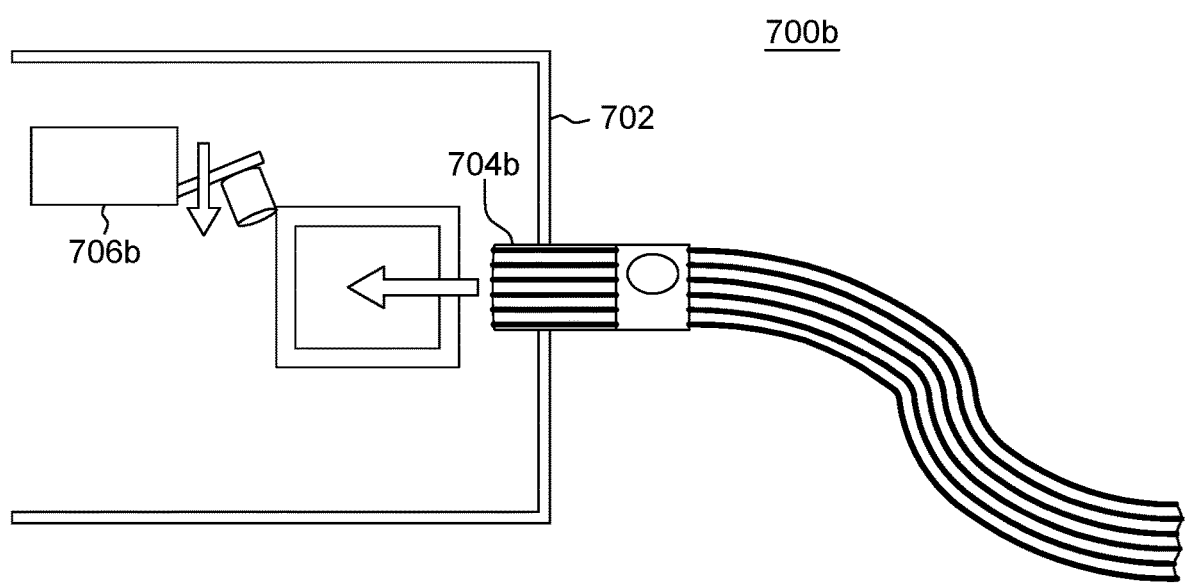

As shown in FIGS. 7A (locked in state) and 7B (unlocked state), pin type lock in port assembly 700a, 700b includes: adapter 702 (that contains port and locking mechanism); special cable end 704a (with recess locked in by pin rotated downward into locked position); special cable end 704b (with pin member rotated upward to unlock and allow disconnection of cable end); pin type locking mechanism 706a (in position with pin rotated downwards to mechanically lock cable end into data communication connection); and pin type locking mechanism 706b (with pin rotated upward to allow cable end to disengage from data communication connection). The pin type lock is a mechanical pin that is moved into place once the cable is plugged into the port. In the case of the pin lock, the pin member (no separate reference numeral) along with the attached lever are the moving part. In the normal state, the pin is down in the locked state preventing a cable from being plugged. When the port is open the cylinder and lever lift up allowing the cable to be plugged. Once the cable is snug inside of the port the level pushes the cylinder down into the cable and secures the cable inside of the adapter not allowing it to be removed.

Some embodiments of the invention: (i) control when a cable can be plugged and unplugged; (ii) prevent a cable from being plugged in by physically obstructing the port; (iii) allow it to be plugged in by physically removing the obstruction; (iv) prevent a cable from being unplugged by physically gripping onto the cable; (v) allow a cable end or card to be unplugged by letting go of a physical grip on the cable; (vi) put a port and connector on a computer, attach it to a physical actuator, and give that control of movement to the lowest level operating system, with very fine grained permissions; (vii) the device and plug have no awareness of security controls; and/or (viii) the device is located entirely in the computer containing the locking port.

Some embodiments of the present invention require a new port and connector to be designed to allow dynamic obstructing and gripping. The design can start with USB or RJ11 as a base, but it still considered a new connector.

As shown in FIG. 8, lock in/lock out data communication port assembly 800 includes: lock control line 802; power source 804; memory interface 806; lock security microcontroller 808; interface protocol controller 810; lock servo control 812; port door actuator 814; port 816; plug 818 and cable 820.

In this embodiment of lock in/lock out data communication port assembly 800, the software that controls access to port 816 implements control for individuals and/or groups of individuals based on permission levels afforded to the user/group. In this example, there are two predefined permission levels: (i) authorized end user level permissions; and (ii) admin level permissions. Each authorized user, or authorized group of users, is given one of these two permission levels. A permission level is a predetermined set of machine logic based rules that sets conditions on the manner in which an authorized user of a given permission level may access the port. In this simple example: (i) authenticated users with admin permission level privileges (or who belong to a group with admin level privileges) may plug a connector into port 816 at any time; and (ii) authenticated users with authorized end user permission level privileges (or who belong to a group with those privileges) may plug a connector into port 816 only during business hours. Alternatively, there may be more permission levels. As a further alternative, in some embodiments, the permissions may be customized at a user by user (or group by group) basis.

One could configure user groups and those groups can be linked to a particular part of the machine. As a result, there are varying levels of permissions and if there are multiple test cells on a machine the hardware associated with those test cells could be accessed by various people as long as they had the correct group privileges.

Some embodiments of the present invention may include one, or more, of the following features, characteristics, advantages and/or operations: (i) ability to configure the software to automatically lock the port when a plug event occurs; (ii) ability to configure the software to close and block without user intervention upon detection of an unplug event; and/or (iii) ability to configure a safeguard such that if there is only one port left on the system that it cannot be blocked and prevent access to the system (configuration and machine dependent but has some value under certain circumstances).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method, comprising:
providing a first computer device with a data communication port that includes an electromechanical lock that is movable between at least two positions as follows: (i) a locked position where any mechanically engaged removable data communication object is locked from being removed from mechanical engagement with the data communication port and any uninserted data communication object is locked out from mechanically engaging the data communication port; and (ii) an unlocked position where removable data communication objects are free to be mechanically engaged and disengaged with the data communication port;
after a removable mechanical data communication object has been mechanically engaged with the data communication port, moving, under control of software running on computer(s), the electromechanical lock from the unlocked position to the locked position so that the removable data communication object cannot be removed from the data communication port;
receiving a request, through software running on computer(s), to unlock the data communication port so that the removable data communication object can be removed from the data communication port, with the request being received by a system administrator device that is used by a system administrator who is a human individual;
responsive to the receipt of the request, receiving from the system administrator and through the system administrator device, authorization to unlock the data communication port;
responsive to receipt of the authorization from the system administrator, unlocking the data communication port so that the removable data communication object can be removed; and
responsive to removal of the data communication object, re-locking, by software running on computer(s), the data communication port so that removable data communication objects can not be mechanically engaged with the data communication port.

2. The CIM of claim 1 wherein the data communication port is structured, sized, shaped and located to receive Ethernet type removable data communication objects.

3. The CIM of claim 1 wherein the data communication port is structured, sized, shaped and located to receive FICON (fiber connection) channel type removable data communication objects.

4. The CIM of claim 1 wherein the data communication port is structured, sized, shaped and located to receive Small Form-factor Pluggable (SFP) and/or Enhanced Small Form-factor Pluggable (SFP+) type removable data communication objects.

5. The CIM of claim 1 wherein the data communication port is structured, sized, shaped and located to receive Gigabit Interface Converter (GBIC) type removable data communication objects.

6. The CIM of claim 1 wherein the data communication port is structured, sized, shaped and located to receive Universal Serial Bus (USB) type removable data communication objects.

7. The CIM of claim 1 wherein the data communication port is structured, sized, shaped and located to receive Direct Attach Cable (DAC) type removable data communication objects.

8. The CIM of claim 1 wherein the request is sent by an information technology (IT) worker who is working on repair and/or maintenance of the first computer device.

\* \* \* \* \*